United States Patent
Stephens et al.

(10) Patent No.: US 7,352,696 B2
(45) Date of Patent: Apr. 1, 2008

(54) METHOD AND APPARATUS TO SELECT AN ADAPTATION TECHNIQUE IN A WIRELESS NETWORK

(75) Inventors: Adrian P. Stephens, Cambridge (GB); Duncan Kitchin, Beaverton, OR (US); Eric A. Jacobsen, Scottsdale, AZ (US); Keith Holt, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 10/637,438

(22) Filed: Aug. 8, 2003

(65) Prior Publication Data
US 2005/0030891 A1 Feb. 10, 2005

(51) Int. Cl.
*H04L 1/00* (2006.01)
*H04L 12/28* (2006.01)
*H04Q 7/00* (2006.01)

(52) U.S. Cl. .................. 370/230; 370/252; 370/328

(58) Field of Classification Search ........... 370/252, 370/253, 230, 232–234, 238, 331–334, 348–349, 370/318, 329, 235, 229, 310, 311, 322
See application file for complete search history.

(56) References Cited

U.S. PATENT DOCUMENTS

| | | | | |
|---|---|---|---|---|
| 4,495,619 A | | 1/1985 | Acampora | 370/104 |
| 5,828,695 A | | 10/1998 | Webb | 375/219 |
| 6,452,964 B1 | * | 9/2002 | Yoshida | 375/222 |
| 6,823,005 B1 | * | 11/2004 | Chuang et al. | 375/227 |
| 2003/0022686 A1 | | 1/2003 | Soomro et al. | 370/104 |
| 2003/0050015 A1 | * | 3/2003 | Kelly et al. | 455/67.4 |
| 2004/0266451 A1 | * | 12/2004 | Stolyar et al. | 455/452.2 |
| 2005/0152465 A1 | * | 7/2005 | Maltsev et al. | 375/260 |

FOREIGN PATENT DOCUMENTS

| | | |
|---|---|---|
| DE | 10154644 | 5/2003 |
| DE | 10154935 | 5/2003 |
| EP | 1128577 | 8/2001 |
| EP | 1137217 A1 | 9/2001 |
| WO | WO-02103610 A3 | 12/2002 |
| WO | WO-03021854 A1 | 3/2003 |
| WO | WO-05018135 A2 | 2/2005 |

OTHER PUBLICATIONS

Pursley, M. B., et al., "An Improved Forwarding Protocol for Updating Channel State Information in Mobile FH Wireless Networks", *Proceedings of the IEEE Military Communications Conference (MILCOM 2001) Communications for Network-Centric operations : creating the information force.* vol. 1 of 2., (Oct. 28, 2001),967-971.

\* cited by examiner

*Primary Examiner*—Firmin Backer
*Assistant Examiner*—Farah Raroul
(74) *Attorney, Agent, or Firm*—The Law Offices of John C. Scott, LLC; John C. Scott

(57) ABSTRACT

An adaptation technique is selected for use in a wireless network based on estimated throughput. In at least one embodiment, throughput is estimated for a wireless channel for both prefix adaptation and postfix adaptation. An adaptation technique is then selected based on the estimates. In some embodiments, an adaptation validity duration is determined to gauge the potential effectiveness of adaptation information associated with a wireless channel.

27 Claims, 6 Drawing Sheets

T – TIME SINCE ADAPTATION INFORMATION LAST OBTAINED

METHOD AND APPARATUS TO SELECT AN ADAPTATION TECHNIQUE IN A WIRELESS NETWORK

FIELD OF THE INVENTION

The invention relates generally to wireless communications and, more particularly, to wireless networking.

BACKGROUND OF THE INVENTION

Adaptation may be used in a wireless network link to compensate for, among other things, changes in channel conditions over time. Different techniques are available for implementing adaptation in a wireless link, each technique having its own advantages and disadvantages. Methods and structures are needed for effectively selecting an adaptation technique for use in a wireless network link.

DETAILED DESCRIPTION

Figure 1:
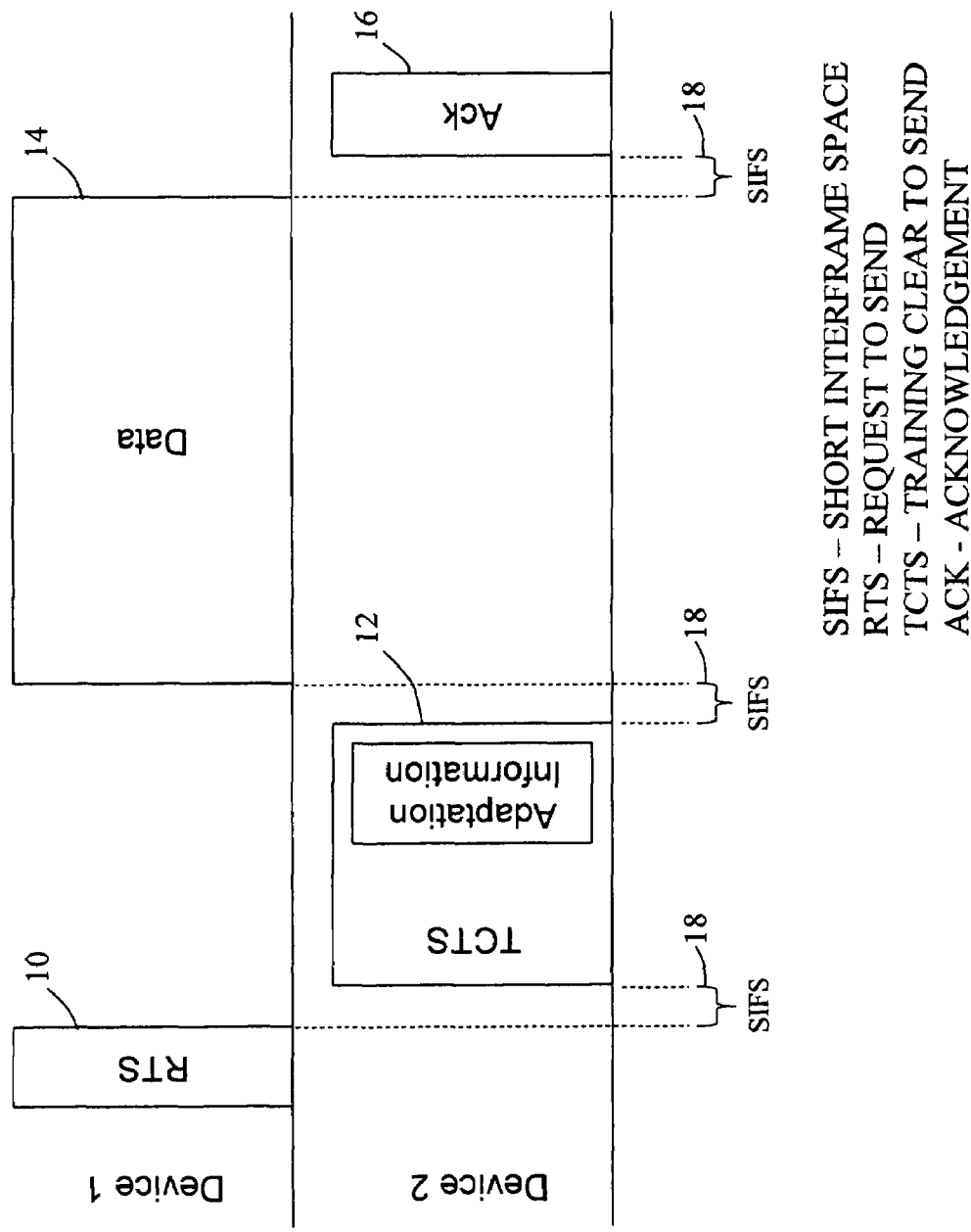
FIG. 1 is a timing diagram illustrating a form of prefix adaptation that may be used in a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A wireless network may use adaptation techniques on the wireless links thereof to allow wireless devices in the network to adapt their transmissions based on, for example, current conditions in the channel. In a wireless channel, the rate of useful data transfer may be dependent upon how well the modulation scheme that is being used matches the current conditions in the channel. If the conditions in the channel are changing over time, as is common in a wireless link, the modulation scheme that is being used may become improper for the channel. Adaptation techniques may be used, for example, to allow the modulation scheme to adapt over time based on the changing channel conditions. Adaptation techniques typically involve the delivery of adaptation information to a wireless transmitting device for use in varying the modulation used to transmit data. Adaptation information may include, for example, signal to noise ratio (SNR), multiple input multiple output (MIMO) channel state and mode selection, transmit power (globally or, in the case of a multicarrier communication schemes such as orthogonal frequency division multiplexing (OFDM), per subcarrier), and/or other types of adaptation information.

In one adaptation technique, known as prefix adaptation, adaptation information is delivered to a transmitting device immediately before a data unit is transmitted and is used to appropriately modulate the data unit for transmission. FIG. 1 is a timing diagram illustrating one form of prefix adaptation that is based upon an extension of the IEEE 802.11 wireless networking standard and that will be referred to herein as an RTS/TCTS exchange. As shown, a transmitting device (Device 1) first transmits a request-to-send (RTS) frame 10 to a receiving device (Device 2) to request a channel. If available, the receiving device sends a training clear-to-send frame 12 (TCTS) back to the transmitting device that includes adaptation information to be used in transmitting the corresponding data. The transmitting device then transmits one or more contiguous data frames 14 to the receiving device. The data frame 14 is modulated using the adaptation information from the TCTS 12. After the data frame 14 has been received, an individual or selective acknowledgement (ACK) frame 16 is delivered to the transmitting device. As illustrated in FIG. 1, a short interframe space or "SIFS" interval 18 may occur between each successive pair of frames. The SIFS interval 18 may have the same duration from frame to frame.

Figure 2:
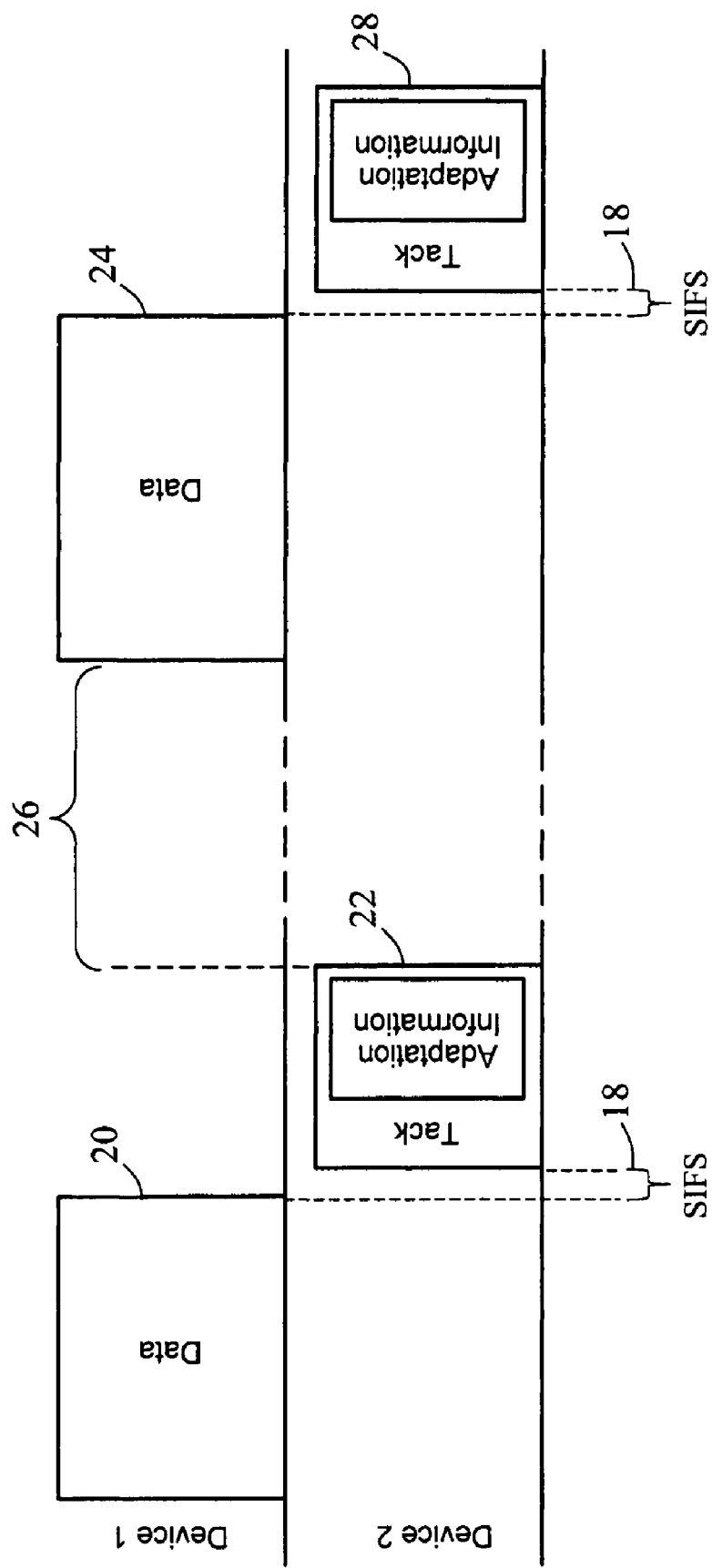
FIG. 2 is a timing diagram illustrating a form of postfix adaptation that may be used in a wireless network.

In another adaptation technique, known as postfix adaptation, adaptation information is received by a transmitting device after a data unit has been transmitted. This postfix adaptation information is then used to modulate the next data unit to be transmitted, which may occur immediately or some arbitrary amount of time later. FIG. 2 is a timing diagram illustrating one form of postfix adaptation that is derived from the acknowledgement function described in the IEEE 802.11 wireless networking standard and which will be referred to herein as "training acknowledgement" or TACK exchange. As shown, a transmitting device (Device 1) first transmits one or more contiguous data frames 20 to a receiving device (Device 2). The receiving device then returns an individual or selective training acknowledgement frame (TACK) 22 to the transmitting device that includes adaptation information measured over the data frame(s) 20. A SIFS interval 18 may occur between the data frame(s) 20 and the TACK 22. The adaptation information is then used to modulate one or more subsequently transmitted data frames 24. As shown, the subsequently transmitted data frames 24 may be transmitted an arbitrary amount of time 26 after the preceding TACK frame 22 is received.

Prefix adaptation typically involves a greater level of overhead than postfix adaptation. However, when postfix adaptation is used, if a subsequent transmission of data occurs a significant amount of time after the adaptation information was received, changes in the channel may have caused the adaptation information to have become "old" and less effective. That is, the adaptation information may cause a modulation scheme to be used that is not in line with the present condition of the channel. In such a case, repeat transmissions may be necessary, thus extending the overall amount of time required to successfully transmit the data. In at least one aspect of the present invention, techniques and structures are provided for dynamically selecting an appropriate adaptation technique to use to transmit data in a wireless network environment.

Figure 3:
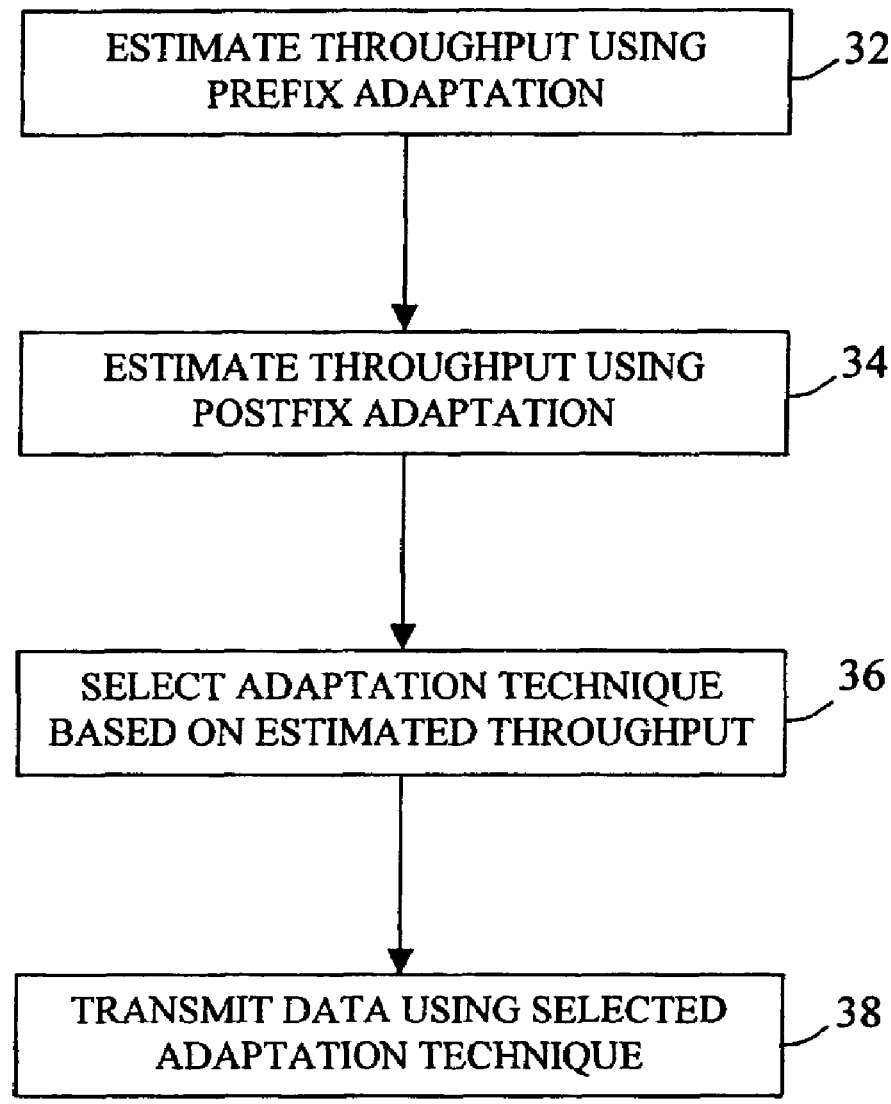
FIG. 3 is a flowchart illustrating an example method for transmitting data in a wireless network in accordance with an embodiment of the present invention.

FIG. 3 is a flowchart illustrating an example method 30 for transmitting data in a wireless network in accordance with an embodiment of the present invention. Before data is transmitted through a wireless channel, the throughput of the data transfer using prefix adaptation is estimated (block 32). The throughput of the data transfer using postfix adaptation is also estimated (block 34). An adaptation technique is then selected for the data transfer based on estimated throughput (block 36). For example, in one approach, the adaptation technique having the highest estimated throughput is selected. The data is then transferred through the channel using the selected adaptation technique (block 38). As used herein, the phrase "data transfer" may refer to the entire information exchange required to effect data transmission through a channel. For example, the entire frame exchange illustrated in FIG. 1 may be considered a data transfer.

Any of a number of different throughput metrics may be used to estimate the throughput of a data transfer (e.g., a frame exchange). In at least one embodiment of the invention, the throughput is estimated as the expected "goodput" of the data transfer divided by the expected total duration of the data transfer. The word "expected" may include the effect of estimated packet error rate and collision probabilities. The expected goodput is defined as the amount of data expected to be successfully received by the exchange. For a single packet of data, the expected goodput may be defined as the probability that the data is transmitted multiplied by the probability that it is received correctly multiplied by the amount of data. For multiple data packets, the estimated goodput may be defined as the probability that the burst is transmitted multiplied by the sum, over all packets, of the packet size multiplied by the probability of correct reception. The probability of correct reception may be determined from previously known adaptation parameters and the length(s) of the data packet(s). The expected total duration of an exchange may be calculated, for example, as a function of the estimated collision probability, the expected data rate, and the amount of data to be sent. In one approach, the expected duration is calculated as a weighted sum of the duration when a collision occurs and the duration when no collision occurs. A wireless device may keep track of collision rate, either globally or per destination. A device may also monitor the average number of slots between channel accesses in order to infer a collision rate. The expected data rate may be based upon, for example, the rate observed in a previous exchange.

In at least one embodiment of the present invention, for the case of prefix adaptation, the estimated throughput may be calculated as follows:

$$T_{prefix} = \frac{(1 - P_{collision}) \sum L_i \cdot (1 - PER(L_i))}{P_{collision} \cdot D_{RTS/TCTS} + (1 - P_{collision}) \cdot D_{RTS/TCTS/DATA/TACK}}$$

where $P_{collision}$ is the probability that a collision occurs, $L_i$ is the length of the ith packet of data, $D_{RTS/TCTS}$ is the duration of a channel access/RTS/SIFS/TCTS sequence, $D_{RTS/TCTS/DATA/ACK}$ is the duration of a channel access/RTS/SIFS/TCTS/Data/Ack sequence, and $PER(L_i) = 1 - (1 - BER)^{(L_i \times 8)}$ is the probability that a packet of length $L_i$ will be received correctly. For the case of postfix adaptation, the estimated throughput may be calculated as follows:

$$T_{postfix} = \frac{(1 - P_{collision}) \sum L_i \cdot (1 - PER(L_i))}{D_{DATA/TACK}}$$

where $D_{DATA/TACK}$ is the duration of a channel access/DATA/TACK sequence. The above equations assume that the data is being transmitted in multiple sub-packets. If only a single data packet is being transmitted, the summations in the equations would vanish. It should be appreciated that the above equations are merely examples of one type of metric that may be used to estimate the throughput of a frame exchange in accordance with an embodiment of the present invention. Alternative techniques also exist.

The above equations may be modified to take into account other parameters such as, for example, fragmentation threshold, modulation type, collision penalty mitigation schemes, effects of virtual carrier sense, and/or others. In at least one embodiment, a number of different combinations of parameters are considered and a combination that results in a highest estimated throughput is selected for the subsequent data transmission. For example, a number of combinations of fragmentation threshold, modulation type, and prefix adaptation may be evaluated and a number of combinations of fragmentation threshold, modulation type, and postfix adaptation may be evaluated and the combination generating the highest estimated throughput may be selected. Other different parameter combinations may alternatively be used.

Figure 4:
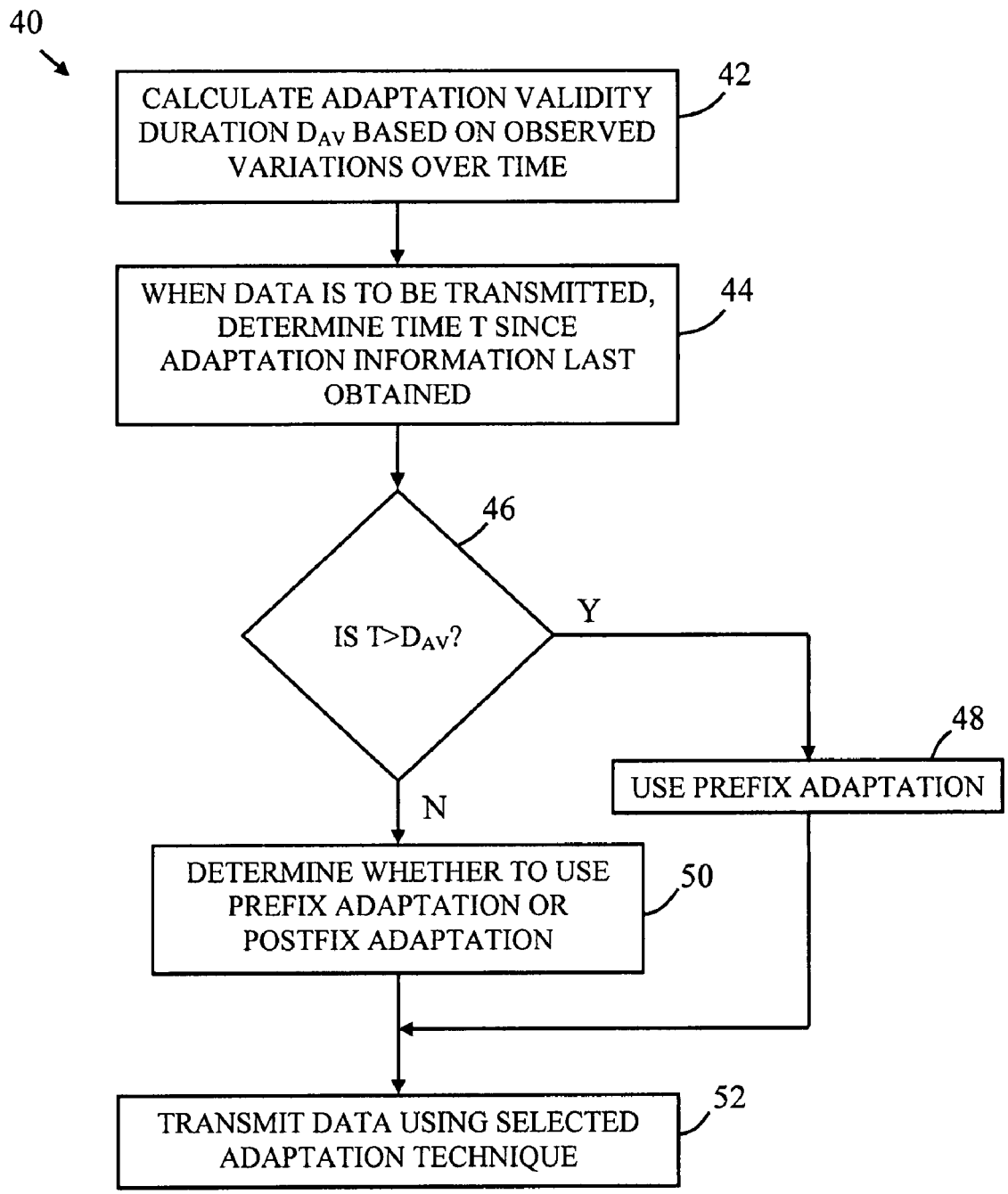
FIG. 4 is flowchart illustrating an example method for transmitting data in a wireless network in accordance with another embodiment of the present invention.

In at least one embodiment of the invention, a wireless device may determine an "adaptation validity duration" parameter that may be used to gauge the potential effectiveness of adaptation information. In one approach, for example, a device may monitor the variation of adaptation parameters present in TCTS and TACK frames as a function of time. An adaptation validity duration may then be calculated as a time beyond which adaptation information may be considered old and invalid. The adaptation validity duration may be calculated either globally or for a particular destination. In addition, the adaptation validity duration may be a one time calculation or the value may be periodically or continually updated over time. Once an adaptation validity duration has been determined, the device may compare the time since it last received adaptation information to the adaptation validity duration as a technique to control its behavior. For example, in one possible scenario, a device may be programmed to always perform a prefix exchange, rather than a postfix exchange, if the adaptation information is older than the adaptation validity duration. FIG. 4 is flowchart illustrating an example method 40 for transmitting data in a wireless network that makes use of such a technique. First, an adaptation validity duration $D_{AV}$ is calculated based on observed adaptation parameter variations over time (block 42). When data is to be transmitted, a time T is determined since adaptation information was last obtained (block 44). If T exceeds $D_{AV}$ (block 46), it is determined that prefix adaptation will be used to transmit the data (block 48). The data is then transmitted using prefix adaptation (block 52). If T does not exceed $D_{AV}$ (block 46), a determination is then made as to whether prefix or postfix adaptation should be used (block 50). In at least one embodiment, the method 30 of FIG. 3 is utilized to determine whether prefix or postfix adaptation should be used. Other methods may alternatively be used. After an adaptation technique has been selected, the data is transmitted using the selected technique (block 52).

Figure 5:
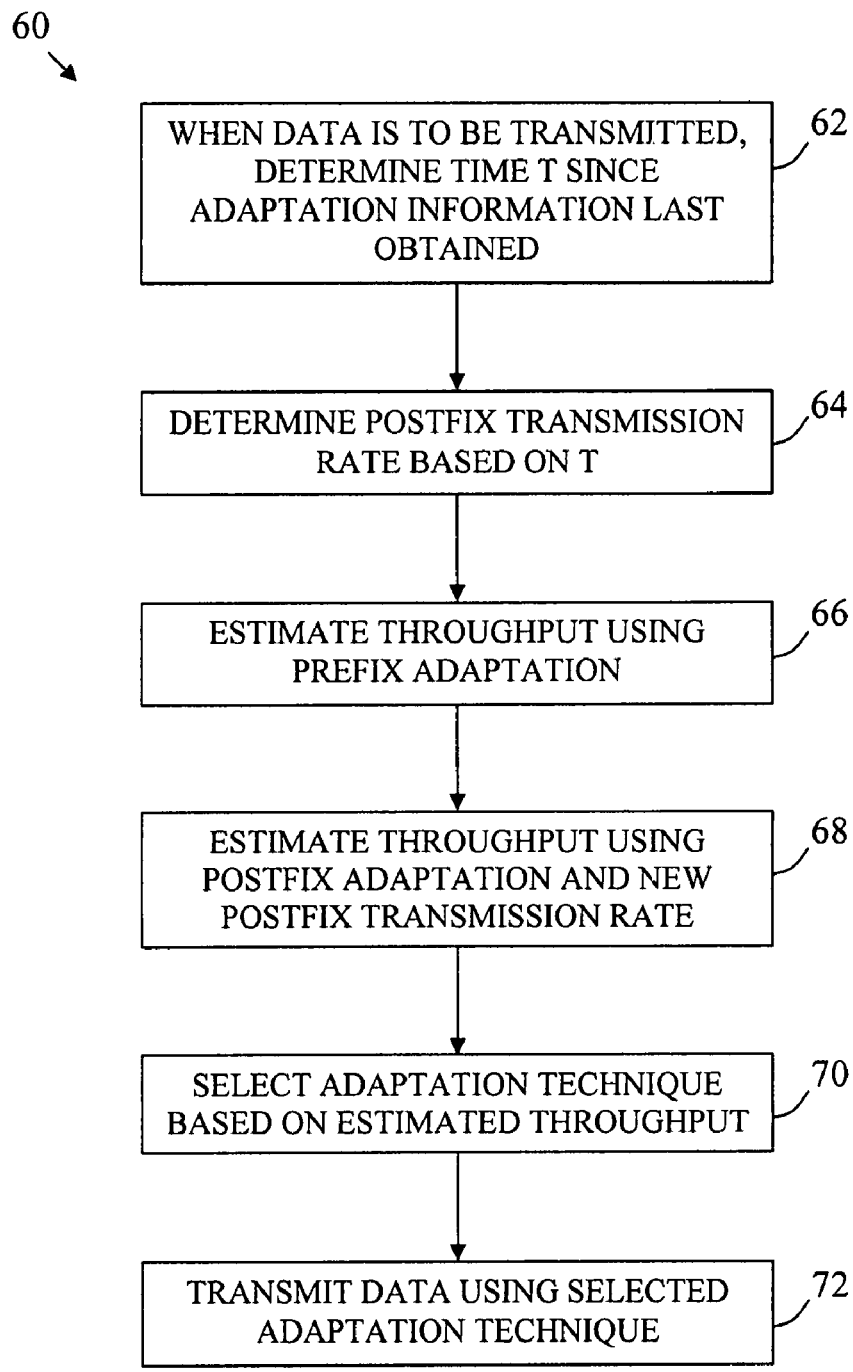
FIG. 5 is a flowchart illustrating an example method for transmitting data in a wireless network in accordance with yet another embodiment of the present invention.

In at least one embodiment of the present invention, the transmission rate for a postfix adaptation exchange may be reduced as the age of the adaptation information increases. The reduced rate may then be taken into consideration when selecting whether to use prefix or postfix adaptation for a subsequent data transmission. FIG. 5 is a flowchart illustrating an example method 60 for transmitting data in a wireless network that makes use of such a technique. As shown in FIG. 5, when data is to be transmitted, a time T is determined since adaptation information was last obtained (block 62). A transmission rate is then determined, based on the value of T, that will be used if postfix adaptation is selected for the subsequent data transmission (block 64). In one possible approach, a full data rate may be used if the time T does not exceed an adaptation validity duration and a reduced data rate may be used if the time T exceeds the adaptation validity duration. In another possible approach, an equation or lookup table may be used to determine a postfix data transmission rate based on T. Other data rate selection techniques may alternatively be used. The throughput of the subsequent data transfer using prefix adaptation is estimated (block 66). The throughput of the data transfer using postfix adaptation and the data rate determined above is also estimated (block 68). An adaptation technique is then selected for the subsequent transfer based on estimated throughput (block 70). The data is then transmitted using the selected adaptation technique (block 72).

In at least one implementation, a wireless network device is able to combine both prefix and postfix adaptation techniques. For example, a receiving device may always provide postfix adaptation and a transmitting device may decide to also use prefix adaptation if the time that has elapsed since a previous exchange exceeds a threshold value (e.g., an adaptation validity duration or similar value). A wireless device may also request varying amounts of adaptation information in a request-to-send (RTS) frame based on, for example, its observation of the stability of the channel and/or the age of the adaptation information known in the device. For example, a device may request MIMO channel state per subcarrier information infrequently, but request overall received signal power frequently. In at least one embodiment, a device may periodically calculate per destination or per signal to noise ratio (SNR) threshold values for total data length versus modulation type to avoid having to frequently perform estimated throughput calculations. The values may be stored within, for example, a lookup table from which they may be retrieved in a timely fashion when needed.

Figure 6:
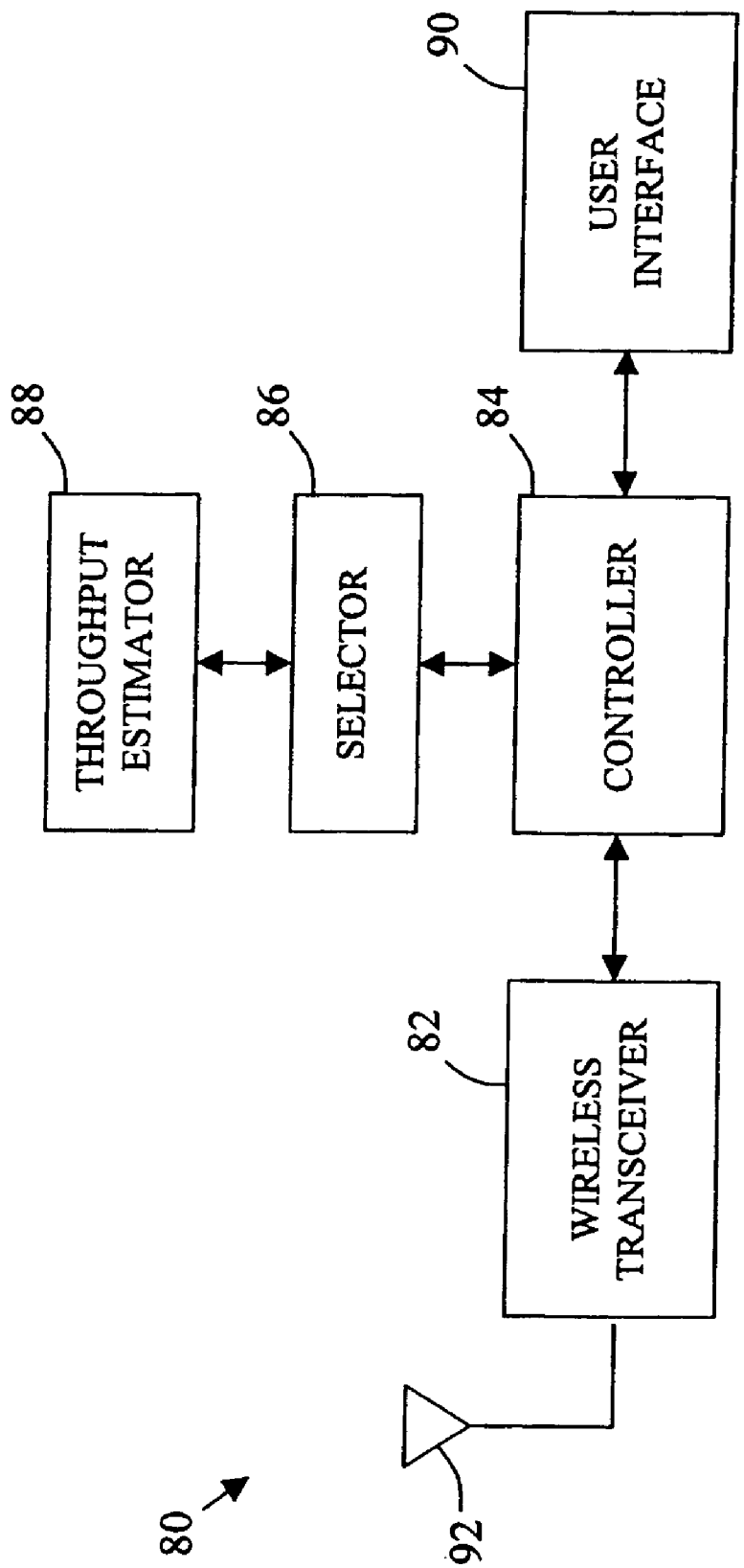
FIG. 6 is a block diagram illustrating an example wireless device in accordance with an embodiment of the present invention.

FIG. 6 is a block diagram illustrating an example wireless device 80 that may be used in a wireless network in accordance with an embodiment of the present invention. As illustrated, the wireless device 80 may include one or more of: a wireless transceiver 82, a controller 84, a selector 86, a throughput estimator 88, a user interface 90, and an antenna 92. The wireless device 80 may be programmed for operation in accordance with one or more wireless networking standards including, for example, IEEE 802.11 a, b, and g, HiperLAN 1 and 2, HomeRF, Ultra Wideband, Bluetooth, one or more cellular network standards, and/or others. The wireless transceiver 82 is operative for communicating with one or more remote wireless entities within the network, via antenna 92. The antenna 92 may be any type of antenna including, for example, a patch, a dipole, a helix, an array, and/or others. In at least one embodiment, multiple antennas 92 are used. The controller 84 is operative for controlling the operation of the device 80. The controller may include, for example, one or more digital processing devices that are capable of executing programs. Such digital processing devices may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. The user interface 90 provides an interface between the device 80 and a user thereof.

When the controller 84 determines that data is to be transmitted by the wireless transceiver 82, it may signal the throughput estimator 88 to estimate a throughput for the data transmission using prefix adaptation and also using postfix adaptation. The selector 86 will then select an adaptation technique for use in transmitting the data based on the throughput estimates. The controller 84 may then cause the data to be transmitted from the wireless transceiver 82 using the selected adaptation technique. The throughput estimator 88 and the selector 86 may be separate units or one or both may be integral with the controller 84 (e.g., software instructions or routines executed within a common processor or processor complex, etc.). As will be appreciated, the wireless device 80 of FIG. 6 is merely an example of one type of device architecture that may be used in accordance with the present invention. Many alternative architectures also exist.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for transmitting data in a wireless channel comprising:

estimating throughput for a subsequent frame exchange using prefix adaptation, wherein prefix adaptation is a technique where, during a frame exchange with a remote entity, adaptation information is received from the remote entity before transmission of one or more data frames to the remote entity, said adaptation information including information on how to adapt a data transmit parameter;

estimating throughput for the subsequent frame exchange using postfix adaptation, wherein postfix adaptation is a technique where, during a frame exchange with a remote entity, adaptation information is received from the remote entity after transmission of one or more data frames to the remote entity;

selecting an adaptation technique from a group including prefix adaptation and postfix adaptation for use in the subsequent frame exchange based on said estimated throughput using prefix adaptation and said estimated throughput using postfix adaptation; and performing the subsequent frame exchange using the selected adaptation technique.

2. The method of claim 1, wherein:
estimating throughput for a subsequent frame exchange using prefix adaptation includes dividing an amount of data expected to be successfully transferred during a frame exchange by an expected total duration of the frame exchange.

3. The method of claim 1, wherein:
estimating throughput for a subsequent frame exchange using prefix adaptation includes evaluating the following equation:

$$T_{prefix} = \frac{(1 - P_{collision}) \sum L_i \cdot (1 - PER(L_i))}{P_{collision} \cdot D_{RTS/TCTS} + (1 - P_{collision}) \cdot D_{RTS/TCTS/DATA/TACK}}$$

where $T_{prefix}$ is the estimated throughput using prefix adaptation, $P_{collision}$ is the probability that a collision occurs, $L_i$ is the length of the ith packet of data that will be transmitted, $D_{RTS/TCTS}$ is the duration of a channel access request to send (RTS)-training clear to send (TCTS) sequence, $D_{RTS/TCTS/DATA/ACK}$ is the duration of a channel access RTS-TCTS-data-acknowledgement (ACK) sequence, $PER(L_i)=1-(1-BER)^{(L_i \times 8)}$ is the probability that a packet of length $L_i$ will be received correctly, and BER is the bit error rate.

4. The method of claim 1, wherein:
estimating throughput for a subsequent frame exchange using postfix adaptation includes evaluating the following equation:

$$T_{postfix} = \frac{(1 - P_{collision}) \sum L_i \cdot (1 - PER(L_i))}{D_{DATA/TACK}}$$

where $T_{postfix}$ is the estimated throughput using postfix adaptation, $P_{collision}$ is the probability that a collision occurs, $L_i$ is the length of the ith packet of data that will be transmitted, $D_{DATA/TACK}$ is the duration of a channel access data-training acknowledgement (TACK) sequence, $PER(L_i)=1-(1-BER)^{(L_i \times 8)}$ is the probability that a packet of length $L_i$ will be received correctly, and BER is the bit error rate.

5. The method of claim 1, wherein:
selecting an adaptation technique for use in the subsequent frame exchange includes selecting an adaptation technique having a higher estimated throughput.

6. The method of claim 1, wherein:
estimating throughput for a subsequent frame exchange using prefix adaptation includes evaluating a number of parameter combinations.

7. The method of claim 6, wherein:
evaluating a number of parameter combinations includes evaluating a number of combinations of fragmentation threshold, modulation type, and prefix adaptation.

8. The method of claim 1, wherein:
estimating throughput for a subsequent frame exchange using postfix adaptation includes evaluating a number of parameter combinations.

9. A method for use in a wireless network, comprising:
determining an adaptation validity duration as an estimate of the useful life of adaptation information;
when data is to be transferred, determining a time T since adaptation information was last obtained; and when time T is greater than the adaptation validity duration, selecting prefix adaptation for a subsequent frame exchange.

10. The method of claim 9, further comprising:
when time T is less than the adaptation validity duration, choosing between prefix adaptation and postfix adaptation for the subsequent frame exchange based upon estimated throughput.

11. The method of claim 10, wherein:
choosing between prefix adaptation and postfix adaptation includes:
estimating throughput for the subsequent frame exchange using prefix adaptation;
estimating throughput for the subsequent frame exchange using postfix adaptation; and
selecting an adaptation technique having a higher estimated throughput.

12. The method of claim 9, wherein:
determining an adaptation validity duration includes monitoring variation of adaptation parameters as a function of time.

13. A method for use in a wireless network, comprising:
determining a time T since adaptation information was last obtained;
determining a postfix data transmission rate to be used when transmitting data using postfix adaptation, based on time T;
estimating throughput for a subsequent frame exchange using prefix adaptation;
estimating throughput for the subsequent frame exchange using postfix adaptation and the postfix data transmission rate; and
selecting an adaptation technique to be used for the subsequent frame exchange based on said estimated throughput using prefix adaptation and said estimated throughput using postfix adaptation.

14. The method of claim 13, further comprising:
performing said subsequent frame exchange using the selected adaptation technique.

15. The method of claim 13, wherein:
determining a postfix data transmission rate includes choosing a first data transmission rate if time T exceeds a threshold value and choosing a second, different data transmission rate if time T does not exceed the threshold value.

16. The method of claim 13, wherein:
determining a postfix data transmission rate includes evaluating an equation that is a function of time T.

17. An article comprising a computer readable storage medium having instructions stored thereon that, when executed by a computing platform, result in:
estimating throughput for a subsequent frame exchange in a wireless channel using prefix adaptation, wherein prefix adaptation is a technique where, during a frame exchange with a remote entity, adaptation information is received from the remote entity before transmission of one or more data frames to the remote entity, said adaptation information including information on how to adapt a data transmit parameter;
estimating throughput for the subsequent frame exchange in the wireless channel using postfix adaptation, wherein postfix adaptation is a technique where, during a frame exchange with a remote entity, adaptation information is received from the remote entity after transmission of one or more data frames to the remote entity;

selecting an adaptation technique from a group including prefix adaptation and postfix adaptation for use in the subsequent frame exchange based on said estimated throughput using prefix adaptation and said estimated throughput using postfix adaptation; and performing said frame exchange in the wireless channel using the selected adaptation technique.

18. The article of claim 17, wherein:

estimating throughput for a subsequent frame exchange using prefix adaptation includes dividing an amount of data expected to be successfully transferred during a frame exchange by an expected total duration of the frame exchange.

19. The article of claim 17, wherein:

estimating throughput for a subsequent frame exchange using prefix adaptation includes evaluating the following equation:

$$T_{prefix} = \frac{(1-P_{collision})\sum L_i \cdot (1-PER(L_i))}{P_{collision} \cdot D_{RTS/TCTS} + (1-P_{collision}) \cdot D_{RTS/TCTS/DATA/TACK}}$$

where $T_{prefix}$ is the estimated throughput using prefix adaptation, $P_{collision}$ is the probability that a collision occurs, $L_i$ is the length of the ith packet of data that will be transmitted, $D_{RTS/TCTS}$ is the duration of a channel access request-to-send (RTS)-training clear-to-send (TCTS) sequence, $D_{RTS/TCTS/DATA/ACK}$ is the duration of a channel access RTS-TCTS-data-acknowledgement (ACK) sequence, $PER(L_i)=1-(1-BER)^{(L_i \times 8)}$ is the probability that a packet of length $L_i$ will be received correctly, and BER is the bit error rate.

20. The article of claim 17, wherein:

estimating throughput for a subsequent frame exchange using postfix adaptation includes evaluating the following equation:

$$T_{postfix} = \frac{(1-P_{collision})\sum L_i \cdot (1-PER(L_i))}{D_{DATA/TACK}}$$

where $T_{postfix}$ is the estimated throughput using postfix adaptation, $P_{collision}$ is the probability that a collision occurs, $L_i$ is the length of the ith packet of data that will be transmitted, $D_{DATA/TACK}$ is the duration of a channel access data-training acknowledgement (TACK) sequence, and $PER(L^j)=1-(1-BER)^{(L_i \times 8)}$ is the probability that a packet of length $L_i$ will be received correctly, and BER is the bit error rate.

21. The article of claim 17, wherein:

estimating throughput for a subsequent frame exchange using prefix adaptation includes evaluating a number of parameter combinations.

22. An apparatus comprising:

a wireless transceiver to transmit and receive wireless signals;

a throughput estimator to estimate the throughput of a subsequent frame exchange using prefix adaptation and the throughput of the subsequent frame exchange using postfix adaptation, wherein prefix adaptation is a technique where, during a frame exchange with a remote entity, adaptation information is received from the remote entity before transmission of one or more data frames to the remote entity and postfix adaptation is a technique where, during a frame exchange with a remote entity, adaptation information is received from the remote entity after transmission of one or more data frames to the remote entity, said adaptation information being information on how to adapt a data transmit parameter; and a selector to select an adaptation technique from a group including prefix adaptation and postfix adaptation for use in the subsequent frame exchange based on said estimated throughput using prefix adaptation and said estimated throughput using postfix adaptation.

23. The apparatus of claim 22, wherein:

said selector selects an adaptation technique that has a higher estimated throughput.

24. The apparatus of claim 22, wherein:

said throughput estimator estimates the throughput of the subsequent frame exchange using prefix adaptation by dividing an amount of data expected to be successfully transferred during the frame exchange by an expected total duration of the frame exchange.

25. A system comprising:

at least two antennas;

a wireless transceiver, coupled to said at least two antennas, to transmit and receive wireless signals;

a throughput estimator to estimate the throughput of a subsequent frame exchange using prefix adaptation and to estimate the throughput of the subsequent frame exchange using postfix adaptation, wherein prefix adaptation is a technique where, during a frame exchange with a remote entity, adaptation information is received from the remote entity before transmission of one or more data frames to the remote entity and postfix adaptation is a technique where, during a frame exchange with a remote entity, adaptation information is received from the remote entity after transmission of one or more data frames to the remote entity, said adaptation information being information on how to adapt a data transmit parameter; and a selector to select an adaptation technique from a group including prefix adaptation and postfix adaptation for use in the subsequent frame exchange based on said estimated throughput using prefix adaptation and said estimated throughput using postfix adaptation.

26. The system of claim 25, wherein:

said selector selects an adaptation technique that has a higher estimated throughput.

27. The system of claim 25, wherein:

said throughput estimator estimates the throughput of the subsequent frame exchange using prefix adaptation by dividing an amount of data expected to be successfully transferred during the subsequent frame exchange by an expected total duration of the subsequent frame exchange.

* * * * *